United States Patent [19]
Enomoto

[11] 3,966,240
[45] June 29, 1976

[54] QUICK-ACTION PIPE JOINT

[75] Inventor: Michitoshi Enomoto, Osaka, Japan

[73] Assignee: Nakamura Kinzoku Kogyosho, Inc., Osaka, Japan

[22] Filed: Mar. 17, 1975

[21] Appl. No.: 558,721

[30] Foreign Application Priority Data
June 4, 1974    Japan............................ 49-66146

[52] U.S. Cl.............................. 285/367; 285/422
[51] Int. Cl.².................... F16L 23/00; F16L 19/02
[58] Field of Search ........... 285/367, 366, 365, 411, 285/410, 407, 408, 409, 329, 173, 422; 24/279, 284, 285; 85/35

[56] References Cited
UNITED STATES PATENTS

| 1,093,868 | 4/1914 | Leighty | 285/367 X |
| 2,689,141 | 9/1954 | Kickhaefer | 285/410 X |
| 3,563,571 | 2/1971 | Werra | 285/367 X |

FOREIGN PATENTS OR APPLICATIONS

| 1,473,759 | 2/1967 | France | 285/367 |
| 1,150,947 | 8/1957 | France | 285/367 |
| 736,879 | 9/1955 | United Kingdom | 285/367 |

Primary Examiner—Thomas F. Callaghan
Attorney, Agent, or Firm—Tab T. Thein

[57] ABSTRACT

Quick-action pipe joint having a pair of clamp members in which tapered groove portions are adapted to engage the peripheries of flanges of the pipes to be connected. The members are curved so as to be able to encircle the pipe flanges, one end of each clamp member being mounted so as to rotate or pivot freely, toward and away from each other. The other ends can be held tightly clamped with a special bolt and a nut arrangement.

3 Claims, 4 Drawing Figures

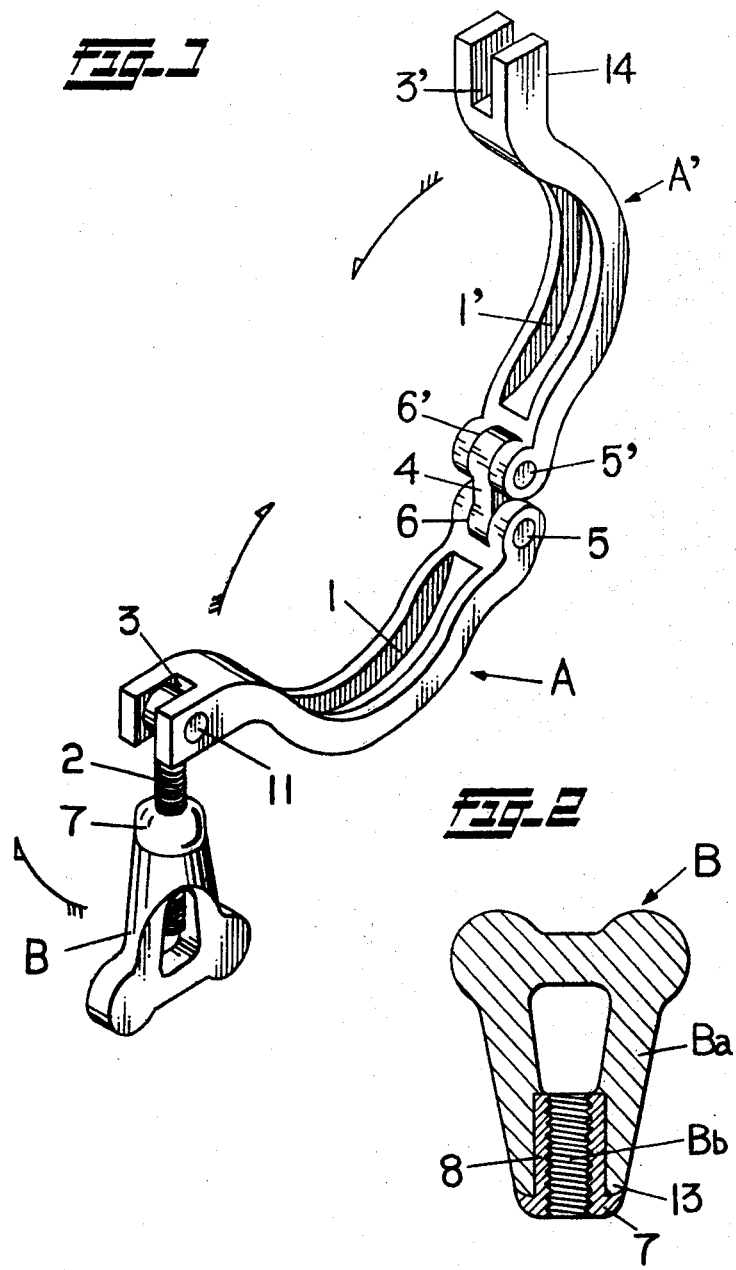

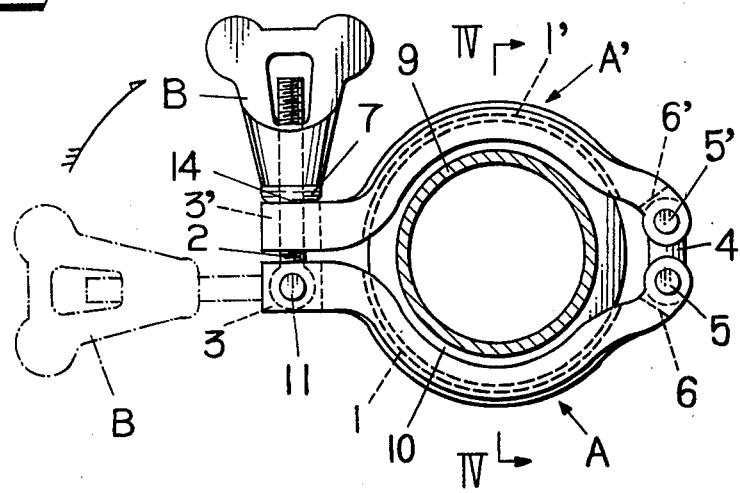
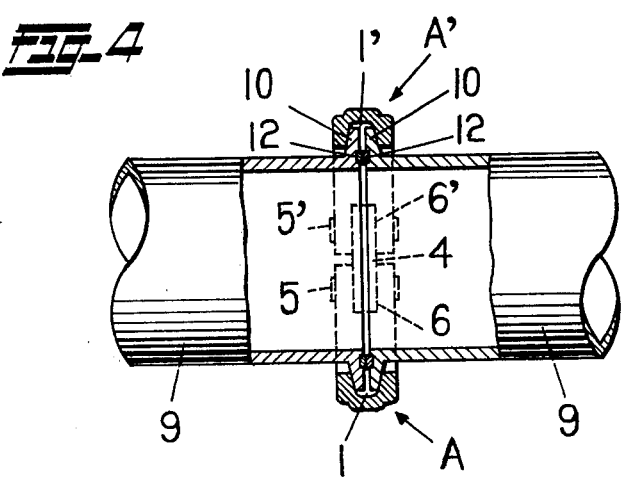

QUICK-ACTION PIPE JOINT

This invention relates to a quick-action pipe joint used principally in the transportation and supporting of pipes for materials in food processing machines.

The pipes are subject to periodical cleaning of their interiors for purposes of hygiene because foods are conveyed within them. Such pipes of the conventional type are connected by several bolts and nuts, mounted between flanges at the end surfaces of the pipes, so that these parts have to be detached, one by one, using appropriate tools, when they are taken apart for cleaning of the pipes. Much time and labor are needed in these operations.

The principal object of this invention is to provide a quick-action pipe joint of a new structure for which no tools are needed, and the detaching and assembling operations are very simple to carry out even by unskilled personnel.

In conventional cases it was possible to avoid the use of tools in such operations by manually applying, securing and tightening butterfly nuts, mounted between the flanges of the pipe end surfaces, but in this case, the clamping forces are not sufficient, the required degree of air-tightness is not ensured, and yet the inconvenience of using several bolts is not resolved.

Accordingly, it is another object of this invention to provide a quick-action pipe joint of a structure in which sufficient clamping forces can be assured with only a single bolt and nut, preferably a butterfly nut.

This invention has further merits in that mass production is possible because only one die is needed in making almost all the parts that constitute the new pipe joint, e.g. from a die-cast aluminum alloy.

Another merit of this invention is that extreme wear of the contact surfaces and the screw portion of the nut is avoided so that the pipe joint members are good for a long period of time, namely by utilizing different materials which receive local loads upon clamping.

Other objects and many of the attendant advantages of the invention will be readily appreciated as the same becomes better understood by reference to the following detailed description, when considered with the accompanying drawings, wherein FIG. 1 is a perspective side view of a quick-action pipe joint according to the invention;

FIG. 2 is a longitudinal sectional view of a butterfly nut forming part of the joint;

FIG. 3 is an elevation showing the manner of use of the inventive pipe joint; and FIG. 4 is a sectional view taken on line IV — IV of FIG. 3.

In the drawings, letters A, A' designate a pair of similar clamp members which are curved so as to be able to encircle the outer peripheries of two pipes 9 (see FIG. 4), and are then opposite each other for joining the pipes 9. The latter have flange portions 10 as shown. These members are preferably die-cast, molded products of aluminum alloy. Tapered grooved portions 1, 1' are provided in the interior of each clamp A, A' to accommodate the flanges 10 of the pipes 9, cut-outs 3, 3' and recesses 6, 6' being formed in respective outer and inner ends or terminal portions thereof.

A short connecting member or link 4 is inserted between the recesses 6, 6', and the clamp members A, A' are mounted so as to move and pivot freely about pins 5, 5' at the ends of the member 4. Thus, the clamp members A, A' are mounted by two-point supports of the pins 5, 5'. Consequently the clamp members can encircle the pipes sufficiently close to the outer peripheries of their flanges 10, absorbing differences of the outer flange diameter or any error occurred at the pins 5, 5' in the process of their manufacture for the two-point supports.

In one of the cut-outs 3, 3', a bolt 2 is mounted with freedom of motion about a pin 11, while the bolt 2 can be moved to engage with or be disengaged from the other cut-out (see FIG. 3). Then the bolt 2 can be tightened with a butterfly nut B which will be described later, and one clamp member A' is clamped with the other member A and the butterfly nut B through the bolt 2 so that the two clamp members A, A' are fixed, as illustrated.

As shown in FIGS. 3, 4, the grooved portions 1, 1' of the clamp members A, A' engage the flanges 10 of the pipes 9, each clamp member encircling one of the pipes, the bolt 2 engaging the cut-out 3' of the other clamp member A' from the dotted-line position of FIG. 3; then the nut B is engaged and applied so as to clamp both members A, A'.

The flanges 10 are thus tightened gradually within the grooved portions 1, 1' only by the tightening with the nut B; as shown in FIG. 4, for the tapered grooved portions 1, 1' are formed inside both clamp members A, A'.

Complete air-tightness is assured by optional packings 12 that can be inserted between adjoining end surfaces of the flanges 10 and yet sufficient durability is obtained for both clamp members A, A' are covered in engagement with the whole periphery of the flanges 10.

There is a possibility that the contact surfaces of the nut B and the clamp member A' get worn because of the abrasion caused on them, e.g. if the nut and the clamp are made of only one material such as aluminum alloy. Accordingly, as shown in FIG. 2, the butterfly nut B of the present invention has a body portion Ba of an aluminum alloy and a screw portion Bb formed by a steel sleeve 8 provided on the extension line of a collar 7 which cover a base or terminal portion 13 of the nut B. Consequently the collar in the sleeve 8 fittingly contacts an upper surface 14 of the clamp member A' (see FIG. 3), and since these contact surfaces are made of a different, stronger material, the afore-mentioned abrasion does not occur any more. Besides such a pipe joint can be made durable as a result of the reduction of abrasion of the contact surfaces and the screw porton BB when the latter is made of steel.

Moreover, the screw portion Bb, constituted by the steel sleeve 8, can be produced by setting the same into the die in which the butterfly nut body Ba is made by casting.

It will be understood by those skilled in the art that the inventive quick-action pipe joint is very easily assembled and disassembled on and from the initially mentioned food processing and conveying pipes. The latter can be cleaned in sections, parts thereof replaced, if necessary, with only minor interruptions of service, owing to the use of the novel, inventive joint. It has proven to be most expedient and useful in various industrial applications, mainly in the food industry.

It should be understood, of course, that the foregoing disclosure relates only to a preferred, exemplary embodiment of the invention, and that it is intended to cover all changes and modifications of the example described which do not constitute departures from the spirit and scope of the invention.

What I claim is:

1. A quick-action pipe joint comprising: a pair of opposed curved clamp members in which interior, tapered grooved portions are formed, for simultaneous engagement with and clamping of at least flange portions of two pipes to be joined; said members having terminal portions with respective cut-outs therein, to engage a bolt having freedom of rotation at one end thereof; and recesses therein to mount a link with pins so as to rotate freely on a surface of the other end; and a nut including a body portion and a sleeve-shaped screw portion, for securing said clamp members at said one end in engagement with said bolt; wherein said clamp members and said nut body portion are mass produced by die-casting and molding from an aluminum alloy, said screw portion is made from an abrasion-resistant material such as steel, extends axially beyond the end of said body portion and is in abutting engagement with the terminal portion of one of said clamp members.

2. The pipe joint as defined in claim 1, wherein said nut screw portion has a collar, also from the abrasion-resistant material that covers from outside a terminal portion of said nut body portion.

3. The pipe joint as defined in claim 1, further comprising at least one packing placed into between said flange portions of the pipes.

* * * * *